Dec. 7, 1965   H. E. FRITZ ETAL   3,221,774
KINKPROOF FIRE HOSE
Filed July 17, 1962

INVENTORS
HARRY E. FRITZ
FREDERICK M. GALLOWAY
BY
ATTORNEY

United States Patent Office 3,221,774
Patented Dec. 7, 1965

3,221,774
KINKPROOF FIRE HOSE
Harry E. Fritz, Philadelphia, and Frederick M. Galloway, Langhorne, Pa., assignors to H. K. Porter Company, Inc., Pittsburgh, Pa., a corporation of Delaware
Filed July 17, 1962, Ser. No. 210,515
1 Claim. (Cl. 138—125)

This invention relates to fire hose such as that used by municipal fire departments, in industrial plants and elsewhere for fire fighting and is particularly directed to a hose suitable for service in systems in which the pressure of water or other fire fighting fluid may range to 300 p.s.i. or more.

Heavy duty double jacketed fire hose has been made by passing an extruded elastomeric tube, usually semi-cured and with opposed strips of uncured elastomeric adhesive on its outer surface, into a woven jacket of heavy yarns of cotton, a polyester terephthalate such as that sold under the trademark "Dacron" by E. I. du Pont de Nemours Company, Wilmington, Delaware, or in some instances a combination of cotton and Dacron, and after the ends of the tube have been fitted with suitable closures admitting high pressure steam to expand the tube into tight engagement with the jacket and complete the cure of elastomeric components which thereby become more or less intimately bonded to the jacket. Next the tube and jacket are placed in another generally similar jacket of slightly larger diameter or, if preferred, are passed axially through a circular loom which progressively weaves an outer jacket over the inner one thus completing the hose which after attachment of end couplings is ready for use.

Under service conditions, however, such hose undergoes axial elongation of up to 7% when subjected to internal pressure and thus may become a source of danger to a fireman holding the hose nozzle and stationed on a fire tower or ladder at the time the high pressure fire extinguishing fluid is admitted to the hose. Moreover the susceptibility of the hose to local collapse when bent may result in the flow of fluid through it being substantially completely cut off most inopportunely.

Efforts to minimize or eliminate these undesirable characteristics of the heavy duty double jacketed fire hose produced before that of our invention have been unsuccessful whereas in our novel hose hereinafter described elongation under pressure is substantially eliminated and controllable within narrow limits of approximately plus or minus 2% while capacity to bend without collapsing is greatly enhanced.

It is therefore a principal object of the present invention to provide a fire hose adapted for high pressure duty having improved characteristics rendering it safer to use and more efficient in operation than known hoses.

A further object is to provide a double jacketed fire hose of novel construction in which a layer of braided yarns is embedded in elastomeric material and a relatively tightly fitted woven layer of preferably synthetic fiber yarns overlies the braided layer in engagement therewith.

Other objects, purposes and advantages of the invention will hereinafter more fully appear or will be understood from the following description of a preferred embodiment of it in which reference will be had to the accompanying drawing wherein.

Figure 1:
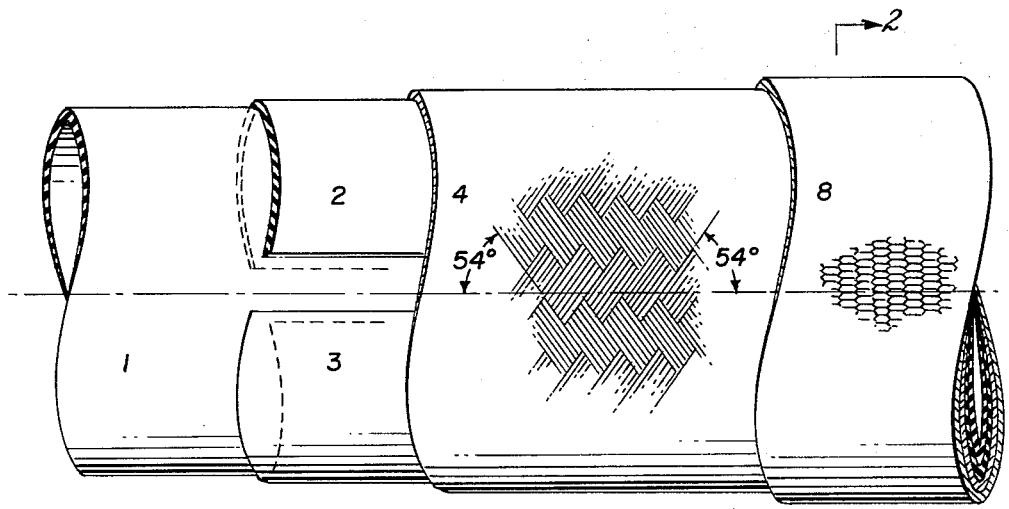
FIG. 1 is a fragmentary diagrammatic side elevation of a piece of our novel hose, with end couplings omitted and certain parts broken away to show the construction of the hose wall.
Figure 2:
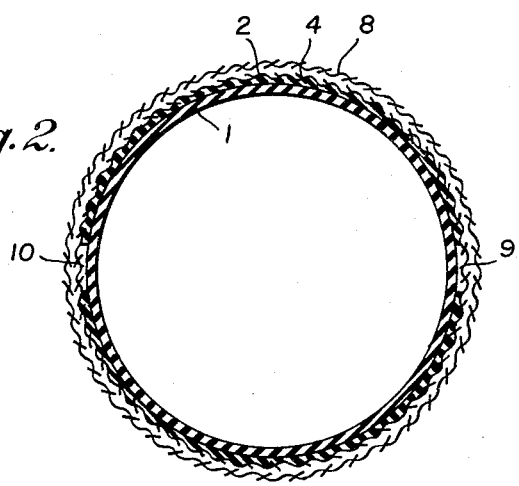
FIG. 2 is a transverse section on line 2—2 in FIG. 1.
Figure 3:
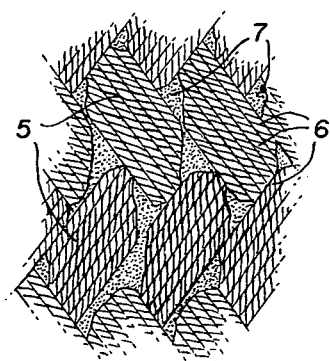
FIG. 3 is a greatly enlarged fragmentary detail in elevation showing the structure of a yarn reinforcing layer comprised in the hose.

The structure of our hose can perhaps best be explained in conjunction with a description of the several steps utilized in making it during which mention may be made of the properties of certain of its components which contribute to the capabilities of the hose in service typical of which for present purposes may be considered its use in fire fighting for conveying fluid under pressure up to or even above 300 p.s.i.

The initial step in its manufacture is the production of an elastomeric inner tube 1 preferably by means of a machine of known type adapted to extrude uncured elastomeric material continuously through an annular orifice to form a seamless tube of indefinite length, appropriate internal diameter corresponding to that of the desired hose, and with a wall thickness of about 0.050" for nominal 2½" hose. This tube, dusted internally during extrusion to prevent adhesion of adjacent walls due to the inherent tackiness of the uncured elastomer, is allowed to assume a natural, somewhat collapsed position as it is cut and laid out flat on trays in convenient lengths of 50 feet or as required and given a semi-cure by heating in a mild oven for a short time. It is then removed from the curing trays and a backing of adhesive uncured elastomeric sheet material applied to its outer surface; strips 2, 3 forming this backing terminate laterally short of meeting at their side edges for a reason which will hereafter appear. Each length of tube is next placed on a relatively rigid mandrel (not shown) and a braided layer 4 applied to it by a horizontal braider of known type, although a vertical braider adapted for application of a like layer to a tube not disposed on a mandrel may be used. This braided layer 4 of spun or continuous filament yarns of Dacron or other suitable synthetic or natural fiber is applied in the form of a plurality of tape-like strands 5 each composed of about six parallel-laid individual yarns 6 in a manner to substantially simulate a coarse 2/2 twill weave and desirably under appreciable tension so the braided layer snugly embraces tube 1 and backing strips 2, 3; this layer is comparable in many respects to the outer reinforcing layer of the Jet Engine Starter Hose disclosed in the copending application of the present inventors and others, Serial No. 30,126, filed May 19, 1960, now Patent 3,117,597, granted January 14, 1964.

The entire assembly comprising the mandrel and the hose components, namely inner tube 1, backing strips 2, 3 and braided layer 4, is next wrapped in a nylon or other suitable fabric tape applied under tension in accordance with known procedures and subjected in conventional manner to heat to vulcanize the elastomeric components; during vulcanizing some of the material of the backing strips is extruded through layer 4 principally at crossings of strands 5 to form spaced elastomeric anchors 7. Following vulcanization the tape and mandrel are removed and an outer jacket 8 of relatively heavy gage Dacron yarns is woven seamless about the braided layer, or the braid covered tube may be drawn into a previously woven jacket; in either case it is desirable the outer jacket snugly embrace braided layer, and after suitable end couplings have been applied the hose is ready for service.

Mention has been made of backing strips 2, 3 being spaced apart at their edges which of course exposes the surface of inner tube 1 to direct contact with braided layer 4 in narrow diametrically opposed longitudinal zones 9, 10 devoid of adhesive or bonding material and the braided layer and inner tube therefore remain unbonded in these zones. This allows the hose when evacuated to lie substantially flat to facilitate reeling or coiling. The angularity of the yarns in the braided layer, preferably at positive and negative angles of 54° to the hose axis, moreover affords a substantial strengthening effect over all to the hose, as internal pressure tending to expand it radially causes the yarns to provide maximum resistance to kinking or collapse of the hose at a bend.

This can be shown mathematically to be due largely to the arrangement in the hose of strands 5 which have maximum tensile strength in the direction of their length, i.e. at substantially said angle to the hose axis whereby when the hose is subjected to internal pressure the radial stress resulting therefrom is opposed by the braided yarns and exerts vector components tending to expand the hose to cylindrical form while reducing its length and thus eliminate collapse at a bend. On the other hand in fire hose comprising the customary woven reinforcement the warp yarns extend substantially parallel to the hose axis while the filler yarns are substantially normal thereto and internal pressure tends to elongate the hose by stretching the warp yarns within their elastic limit setting up local stresses which promote rather than eliminate collapse at a bend and kinks therefore result.

In our hose, however, the braided strands 5 are disposed substantially at positive and negative angles of 54° to the hose axis or 36° to a plane normal to that axis which specific angle is deemed critical from the standpoint of kink resistance as may be demonstrated by considering any point on the hose surface while the hose is under internal pressure necessarily exerting against its wall both longitudinal and radial stresses, the latter being resolved circumferentially in the fabric of the wall. The stresses at such point are then in equilibrium, i.e. exactly balanced against each other, when $$Sc \sin B = Sl \cos B$$

where $Sc$ is the circumferential stress, $Sl$ the longitudinal stress and B the angle made by the strand and a plane normal to the hose axis. Utilizing well known mathematical principles it can be shown the above relation obtains when $B=35.3°$ and from this it is readily apparent that when B is greater than 35.3° internal pressure tends to expand the hose circumferentially and reduce its length whereas when the said angle is less than 35.3° the effect of internal pressure is more strongly directed toward elongating the hose and reducing its circumference. Thus at 54° to the hose axis (36° to a plane normal thereto) as indicated in the drawing there is a moderate tendency toward circumferential expansion and length reduction in our hose on initial application of internal fluid pressure which is effective at a sharp bend where the hose may be completely collapsed prior to admission of fluid to separate the collapsed hose wall and allow the fluid to pass whereas when the disposition of the strands is such that the hose tends to elongate under pressure the effect is just the opposite and a localized collapsed area therefore is forced by the resultant stresses to remain collapsed and hence to restrict passage of fluid.

The radial expansion of the inner jacket effected by internal pressure in our hose of course is limited by the outer woven jacket 8 and this tends to maintain the hose circular in cross section, and when the pressure is extreme some slight elongation of the hose as a whole may occur. This, however, is of little, if any, significance, as it occurs, if at all, only after all kinks or sharp bends have been eliminated as aforesaid and the hose has been filled to capacity throughout its length by the fluid.

It results that our hose may be quickly run out from a fire truck, reel or the like and high pressure fluid admitted at once with automatic elimination of any twists, kinks or sharp bends which may have formed insuring full flow of fluid at the nozzle substantially immediately; the time required for putting the hose in service is thereby minimized while the limited elongaton of the hose on admission of high pressure fluid reduces risk of a fireman holding the nozzle being forced from his station or losing his grip as the hose fills.

While we prefer to use synthetic fiber yarns in our hose it will be evident that cotton or other natural fiber yarn can be employed if desired although usually with less satisfaction.

While we have herein illustrated and described one embodiment of our invention with considerable particularity we do not desire or intend to be restricted or confined thereto or thereby in any way and we especially negate limitation to use in the manufacture of our hose of the specific materials we have mentioned as being suitable for its several components, or to the precise mechanical steps employed in bringing them together, since departures from our disclosure in these and other respects as will readily occur to those skilled in the art may be availed of as desired within the spirit and scope of the appended claim.

Having thus described our invention we claim and desire to protect by Letters Patent of the United States:

A collapsible fire hose comprising an inner elastomeric tube of substaantially uniform thickness the inside diameter of which is a large multiple of its wall thickness, a pair of diametrically opposed elastomeric longitudinally extending backing strips bonded to the outer surface of the tube with their opposed edges spaced apart circumferentially to define between them longitudinally continuous relatively narrow diametrically opposed areas of the tube, a layer of reinforcing elements wound about the outer surfaces of the tube and strips, each element comprising a plurality of yarns laid side by side in substantially parallel relation certain of the elements extending spirally at a positive angle of approximately 54° to the axis of the tube and others thereof extending spirally at a negative angle of approximately 54° thereto, the elements extending at said positive angle passing alternately over and under adjacent ones extending at said negative angle and all being bonded partially into the strips but unbonded to the inner elastomeric tube at said narrow diametrically opposed areas, and a woven jacket surrounding the elements in snug but slidable engagement therewith.

References Cited by the Examiner

UNITED STATES PATENTS

| | | | |
|---|---|---|---|
| 957,867 | 5/1910 | Cobb | 138—126 |
| 1,235,878 | 8/1917 | Cole | 138—119 |
| 1,455,359 | 5/1923 | Schulthness | 138—126 |
| 2,512,433 | 6/1950 | Leben | 138—126 |
| 2,906,638 | 9/1959 | Herman. | |
| 2,939,488 | 6/1960 | Bacon | 138—126 |
| 3,011,525 | 12/1961 | Randle et al. | 138—126 |
| 3,042,737 | 7/1962 | Brumbach et al. | 138—125 XR |
| 3,117,597 | 1/1964 | Fritz et al. | 138—125 |

FOREIGN PATENTS

| | | |
|---|---|---|
| 807,171 | 10/1936 | France. |
| 833,492 | 7/1938 | France. |

LEWIS J. LENNY, *Primary Examiner.*

EDWARD V. BENHAM, *Examiner.*